(12) United States Patent
Snyder et al.

(10) Patent No.: US 12,137,329 B2
(45) Date of Patent: Nov. 5, 2024

(54) FIELD OF VIEW BASED AUDIO SELECTION

(71) Applicant: Cisco Technology, Inc., San Jose, CA (US)

(72) Inventors: Ian Matthew Snyder, San Francisco, CA (US); Ramkrishna Swamy, Morgan Hill, CA (US)

(73) Assignee: Cisco Technology, Inc., San Jose, CA (US)

( * ) Notice: Subject to any disclaimer, the term of this patent is extended or adjusted under 35 U.S.C. 154(b) by 190 days.

(21) Appl. No.: 18/049,234

(22) Filed: Oct. 24, 2022

(65) Prior Publication Data

US 2024/0137695 A1   Apr. 25, 2024
US 2024/0236562 A9   Jul. 11, 2024

(51) Int. Cl.
| | |
|---|---|
| H04R 29/00 | (2006.01) |
| G06F 3/0346 | (2013.01) |
| H04R 1/02 | (2006.01) |
| H04R 1/40 | (2006.01) |
| H04R 3/00 | (2006.01) |

(52) U.S. Cl.
CPC .......... *H04R 3/005* (2013.01); *G06F 3/0346* (2013.01); *H04R 1/028* (2013.01); *H04R 1/406* (2013.01); *H04R 29/005* (2013.01); *H04R 2499/11* (2013.01)

(58) Field of Classification Search
CPC ........ H04R 3/005; H04R 1/028; H04R 1/406; H04R 29/005; G06F 3/0346
See application file for complete search history.

(56) References Cited

U.S. PATENT DOCUMENTS

| | | | |
|---|---|---|---|
| 11,218,802 B1* | 1/2022 | Kandadai | ................ G06F 3/165 |
| 11,854,564 B1* | 12/2023 | Chatlani | ................ G10L 15/16 |
| 2012/0155703 A1* | 6/2012 | Hernandez-Abrego | ..................... A63F 13/213 382/103 |
| 2013/0216050 A1 | 8/2013 | Chen et al. | |
| 2015/0281589 A1 | 10/2015 | Seo | |
| 2017/0303043 A1* | 10/2017 | Young | .................. H04N 23/633 |
| 2021/0217432 A1* | 7/2021 | Zheng | .................... H04R 1/406 |
| 2022/0060627 A1 | 2/2022 | Tisch et al. | |
| 2022/0260664 A1 | 8/2022 | Vilermo et al. | |
| 2022/0377486 A1* | 11/2022 | Arya | ........................ G06F 3/167 |

* cited by examiner

*Primary Examiner* — Simon King
(74) *Attorney, Agent, or Firm* — Polsinelli P.C.

(57) ABSTRACT

Systems and methods are described for improving audio quality. Sensor data is received from an accelerometer of a camera. Based on measurements captured by the sensor data, a position of a lens of the camera and a current field of view (FOV) of the camera is determined. Audio beamforming is performed based on the current FOV of the camera by selecting a subset of microphones disposed on the camera to record audio based on the position of the lens and the current FOV of the camera; and activating the subset of microphones disposed on the camera, where microphones outside the selected subset of microphones are excluded from activation so that audio originating outside of the current FOV is removed.

20 Claims, 7 Drawing Sheets

FIELD OF VIEW BASED AUDIO SELECTION

BACKGROUND

Security cameras are usually mounted in some corners of a building or a room and due to their conspicuous location, the camera may have near objects and far objects in the field of view (FOV).

However, conventional security camera systems may not work well for areas with many sources of noise or for certain environments that increase the reflection of sound. Security camera systems often deploy an array of fisheye cameras, attached to a ceiling or structure above a region of a scene, which is then recorded by the cameras. Fisheye cameras can provide a full 360-degree field-of-view (FOV) or other wide viewing angles, making them ideal for covering large areas. The lens of the camera, which is typically in the center of the camera, can change its direction (e.g., by panning, tilting, zooming) to adjust the FOV or focus of the camera. The camera can also include microphones that can be activated to capture audio data. In current camera systems, the microphones on the camera are activated to record audio. However, the audio captured by the microphones of the camera can include noise or audio that may not be pertinent to an area of a scene that is within the FOV of the camera and/or a target within the FOV of the camera.

BRIEF DESCRIPTION OF THE SEVERAL VIEWS OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

DETAILED DESCRIPTION

Figure 1:
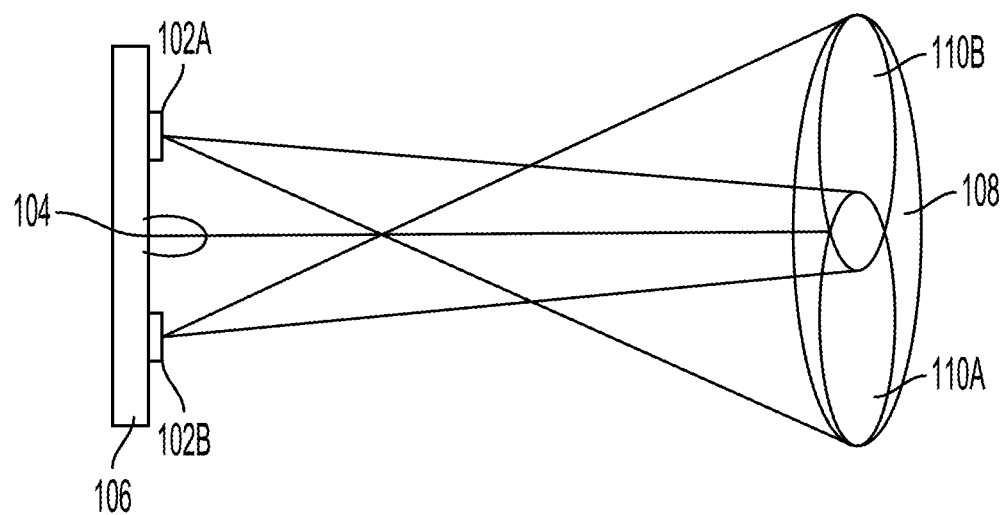
FIG. 1 illustrates a side view of a camera performing beamforming within a current FOV in accordance with an example embodiment.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

The present disclosure is directed to techniques for improving the audio quality of a camera by selecting a subset of microphones on a camera based on a field-of-view (FOV) of the camera.

In one aspect, a method for improving audio quality includes receiving sensor data from an accelerometer of a camera. A position of a lens of the camera is determined based on measurements captured by the sensor data, and a current field of view (FOV) of the camera is determined based on the measurements captured by the sensor data. Audio beamforming is performed based on the current FOV of the camera by selecting a subset of microphones disposed on the camera to record audio based on the position of the lens and the current FOV of the camera, and activating the subset of microphones disposed on the camera, where microphones outside the selected subset of microphones are excluded from activation so that audio originating outside of the current FOV is removed.

In another aspect, audio from one or more microphones on the camera is analyzed to determine signal amplitudes within the audio, and the subset of microphones to be activated is selected based on the one or more microphones with a highest signal amplitude or lowest average level of noise.

In another aspect, based on the sensor data from the accelerometer and a gyroscope of the camera, a direction of incident light received by a lens of the camera is determined. The subset of microphones disposed on the camera are selected to record audio based on the direction of incident light received by the lens, and the subset of microphones are activated to record audio within the current FOV of the camera.

In another aspect, first accelerometer data from a first accelerometer disposed on the base of the camera is received. Second accelerometer data from a second accelerometer disposed on a sensor board of the camera is received, where the sensor board of the camera is moveable to point in a range of directions. A direction the lens of the camera is pointed towards in relation to a body of the camera is detected based on a combination of at least the first accelerometer data and the second accelerometer data, where the detected direction of the lens of the camera provides dynamic information about tilt and movement of the lens in relation to the body of the camera, and where the camera body is a point of reference for the movement of the lens.

In another aspect, the audio beamforming is arranged to match an area covered by the current FOV of the camera, where the audio beamforming matches a direction the lens is pointed and sound outside the current FOV is attenuated.

In another aspect, a first mode of matching the audio beamforming to the current FOV is switched to a second mode of receiving omnidirectional audio.

In another aspect, one or more microphones are determined to be occluded by a portion of the camera body, preventing audio detection for a region of interest within the current FOV. The subset of microphones are dynamically selected based on the determination that each microphone within the subset is not occluded by the portion of the camera body.

In one aspect, a computing apparatus includes a processor and a memory storing instructions that, when executed by the processor, configure the apparatus to receive sensor data from an accelerometer of a camera. A position of a lens of the camera is determined based on measurements captured by the sensor data, and a current field of view (FOV) of the camera is determined based on the measurements captured by the sensor data. Audio beamforming is performed based on the current FOV of the camera by selecting a subset of microphones disposed on the camera to record audio based on the position of the lens and the current FOV of the camera, and activating the subset of microphones disposed on the camera, where microphones outside the selected subset of microphones are excluded from activation so that audio originating outside of the current FOV is removed.

In another aspect, the instructions further configure the apparatus to analyze audio from one or more microphones on the camera to determine signal amplitudes within the audio, and the subset of microphones to be activated is selected based on the one or more microphones with a highest signal amplitude or lowest average level of noise.

In another aspect, the instructions further configure the apparatus to, based on the sensor data from the accelerometer and a gyroscope of the camera, determine a direction of incident light received by a lens of the camera. The subset of microphones disposed on the camera are selected to record audio based on the direction of incident light received by the lens, and the subset of microphones are activated to record audio within the current FOV of the camera.

In another aspect, the instructions further configure the apparatus to receive first accelerometer data from a first accelerometer disposed on the base of the camera. Second accelerometer data from a second accelerometer disposed on a sensor board of the camera is received, where the sensor board of the camera is moveable to point in a range of directions. A direction the lens of the camera is pointed towards in relation to a body of the camera is detected based on a combination of at least the first accelerometer data and the second accelerometer data, where the detected direction of the lens of the camera provides dynamic information about tilt and movement of the lens in relation to the body of the camera, and where the camera body is a point of reference for the movement of the lens.

In another aspect, the instructions further configure the apparatus to arrange the audio beamforming to match an area covered by the current FOV of the camera, where the audio beamforming matches a direction the lens is pointed and sound outside the current FOV is attenuated.

In another aspect, the instructions further configure the apparatus to switch between a first mode of matching the audio beamforming to the current FOV to a second mode of receiving omnidirectional audio.

In another aspect, the instructions further configure the apparatus to determine one or more microphones are occluded by a portion of the camera body, preventing audio detection for a region of interest within the current FOV. The subset of microphones are dynamically selected based on the determination that each microphone within the subset is not occluded by the portion of the camera body.

In one aspect, a non-transitory computer-readable storage medium includes instructions that when executed by a computer, cause the computer to receive sensor data from an accelerometer of a camera. A position of a lens of the camera is determined based on measurements captured by the sensor data, and a current field of view (FOV) of the camera is determined based on the measurements captured by the sensor data. Audio beamforming is performed based on the current FOV of the camera by selecting a subset of microphones disposed on the camera to record audio based on the position of the lens and the current FOV of the camera, and activating the subset of microphones disposed on the camera, where microphones outside the selected subset of microphones are excluded from activation so that audio originating outside of the current FOV is removed.

In another aspect, the instructions further configure the apparatus to analyze audio from one or more microphones on the camera to determine signal amplitudes within the audio, and the subset of microphones to be activated is selected based on the one or more microphones with a highest signal amplitude or lowest average level of noise.

In another aspect, the instructions further configure the computer to, based on the sensor data from the accelerometer and a gyroscope of the camera, determine a direction of incident light received by a lens of the camera. The subset of microphones disposed on the camera are selected to record audio based on the direction of incident light received by the lens, and the subset of microphones are activated to record audio within the current FOV of the camera.

In another aspect, the instructions further configure the computer to receive first accelerometer data from a first accelerometer disposed on the base of the camera. Second accelerometer data from a second accelerometer disposed on a sensor board of the camera is received, where the sensor board of the camera is moveable to point in a range of directions. A direction the lens of the camera is pointed towards in relation to a body of the camera is detected based on a combination of at least the first accelerometer data and the second accelerometer data, where the detected direction of the lens of the camera provides dynamic information about tilt and movement of the lens in relation to the body of the camera, and where the camera body is a point of reference for the movement of the lens.

In another aspect, the instructions further configure the computer to arrange the audio beamforming to match an area covered by the current FOV of the camera, where the audio beamforming matches a direction the lens is pointed and sound outside the current FOV is attenuated.

In another aspect, the instructions further configure the computer to switch between a first mode of matching the audio beamforming to the current FOV to a second mode of receiving omnidirectional audio.

Description of Example Embodiments

Methods and systems are disclosed for improving the audio quality of a camera by selecting a subset of microphones on a camera based on a field-of-view (FOV) of the camera. The present technology addresses the need in the art for techniques that remove noise within audio recordings that is not within the camera's FOV, thereby providing cleaner audio.

In current camera systems, no consideration is given to taking into account the pose of the lens of the camera or the FOV of the camera. In the methods and systems described below, the camera system can take into account a current FOV of a camera when activating one or more microphones of the camera. For example, the camera system can perform audio beamforming that takes into account the FOV of the camera to capture audio.

FIG. 1 illustrates a side view of a camera performing beamforming within a current FOV in accordance with an example embodiment. As shown in FIG. 1, first and second microphones 102A and 102B are mounted on a base 106. A camera including a lens 104 in a center of the camera may capture sound from objects, people, animals, etc., which covers the region of current FOV 108.

In example embodiments, each camera within an array of cameras within a security system employ a number of microphones located on the base 106 of the camera (e.g., four microphones at equal distances apart from each other). The spacing of the microphones can be changed depending on the configuration of the microphones. In the example embodiment shown, the two microphones 102A and 102B are disposed upon the base 106 such that the first microphone 102A illustrates a first zone 110A, while the second microphone 102B illustrates a second zone 110B. The cameras can also include multiple sensors. On the backside of the lens unit, for example on the base 106, the cameras can have an accelerometer (or an inertial measurement unit) and, on the back of the sensor board, the cameras can include a gyroscope (or an inertial measurement unit). The accelerometer can record/measure a specific force of the lens (e.g., the linear acceleration) and the gyroscope can record/measure changes in the orientation of the lens (e.g., the rotational rate).

The camera can perform beamforming using a subset of the microphones that are selected and activated based on the position of the lens 104 and/or the current FOV 108. Rather than receiving sound from all directions, beamforming uses multiple microphones to capture the sound from a tighter, controlled area in a directional signal reception technique. In beamforming, the camera controls the processing of the phase and amplitude of the sound signals captured by the microphones, where the sound signals from different microphones are combined in a way where the expected pattern of sound capture is preferentially observed. For example, the beamformer processes the data by applying a pattern of constructive and destructive interference in the wavefront so that areas outside the current FOV 108 is removed through destructive interference. For example, in the example shown, the sounds within the current FOV 108 may be covered by beamforming techniques employing the first and second microphone zones 110A and 110B, which have overlapping areas covering the current FOV 108. Any sound outside the current FOV 108 is canceled and/or removed from being recorded by first and second microphones 102A and 102B through destructive interference in the recorded wavefront.

Which microphones are activated to perform the beamforming, such as first and second microphones 102A and 102B, is determined based on measurements of the position of the lens 104 and/or the lens' current FOV 108. For example, the position of the lens 104 (e.g., and thus the current FOV 108 of the camera or the direction of incident light received by the lens) can be determined based on measurements from the accelerometer and/or the gyroscope described above. In some embodiments, only the accelerometer is needed to determine the position and current FOV 108 of the lens 104. The position of the lens 104 (and thus the current FOV 108 of the camera) can be used to determine which microphones on the camera to activate in order to better capture audio from an area within the current FOV 108 of the camera, such as from a same direction as the incident light received by the lens 104. For example, the accelerometer and gyroscope measurements can be used to determine the position and current FOV 108 of the lens 104. The position and current FOV 108 of the lens 104 can then be used to select a specific subset of microphones to record audio while any other microphones may not be activated. The subset of microphones can include those microphones on the camera that are located on a same side relative to the camera as an area within the current FOV 108 of the camera and/or a same direction as the incident light received by the lens 104 of the camera. This way, the audio captured by the microphones of the camera can be focused on audio received from (and/or originating from) the area within the current FOV 108 of the camera and/or the same direction as the incident light received by the lens 104 of the camera.

Figure 2:
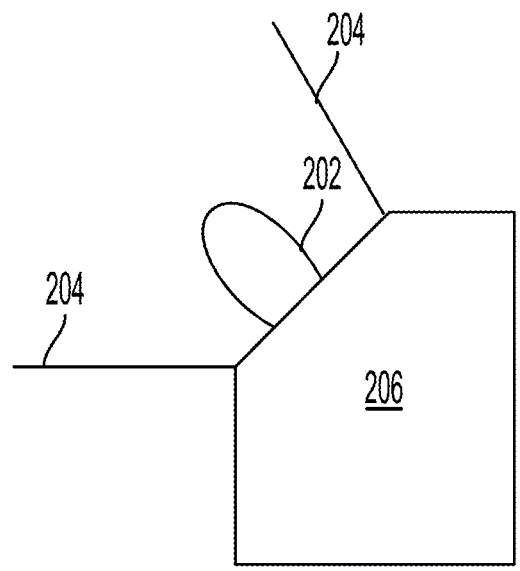
FIG. 2 illustrates a lens of a camera mounted to a base, in accordance with an example embodiment.

FIG. 2 illustrates a lens 202 of a camera mounted to a base 206, in accordance with an example embodiment. The lens 202 of the camera is mounted on the base 206 such that the lens 202 can shift its current FOV 204 by modifying its tilt angle. The tilt angle can vary dynamically. One or more accelerometers and/or gyroscopes on the base 206 can measure the tilt and resulting modification to the camera's current FOV 204. This dynamic measurement can be helpful in the case of aligning non-overlapping microphone zones within the current FOV 204. To increase the beamforming area within the modified FOV 204, the selection of which microphones to activate can be modified accordingly to create coverage in a non-overlapping area to conform the size of the beamforming zone within the changing FOV 204.

Figure 3:
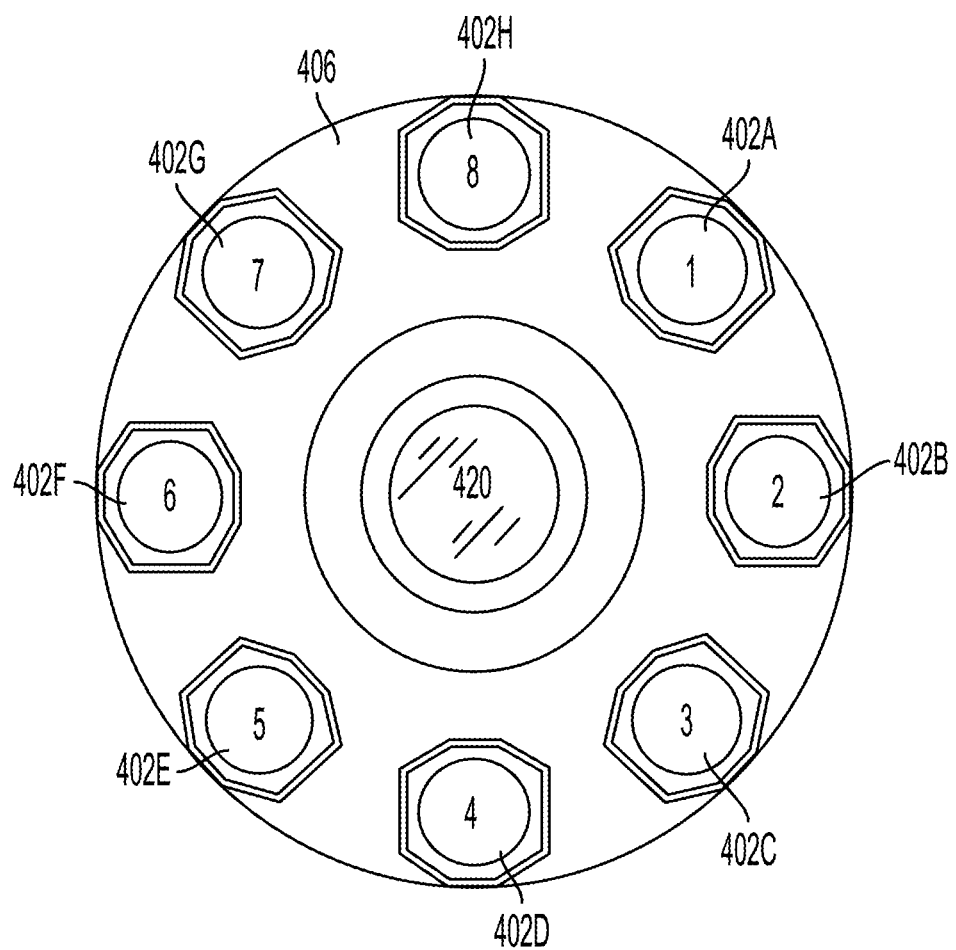
FIG. 3 illustrates an example camera including multiple microphones, in accordance with an example embodiment.

FIG. 3 illustrates an example camera including multiple microphones, in accordance with an example embodiment. The example embodiment shown depicts eight microphones mounted on a base including a lens 420 having different tilt angles towards or away from the center in accordance with some aspects of the disclosed technology. The first set of four microphones 402A-D, and the second set of four microphones 402E-H are mounted on a base 406. All the microphones are spaced equally along a circumference in the example embodiment shown. The first set of microphones may have a different beamforming coverage from the second set of microphones.

It will be appreciated by those skilled in the art that the arrangement of the microphones, the number of the microphones, and tilt angles of the lens 420 may vary to cover a region for a particular application. The region will be covered by a number of microphone zones created by a number of activated microphones.

Figure 4:
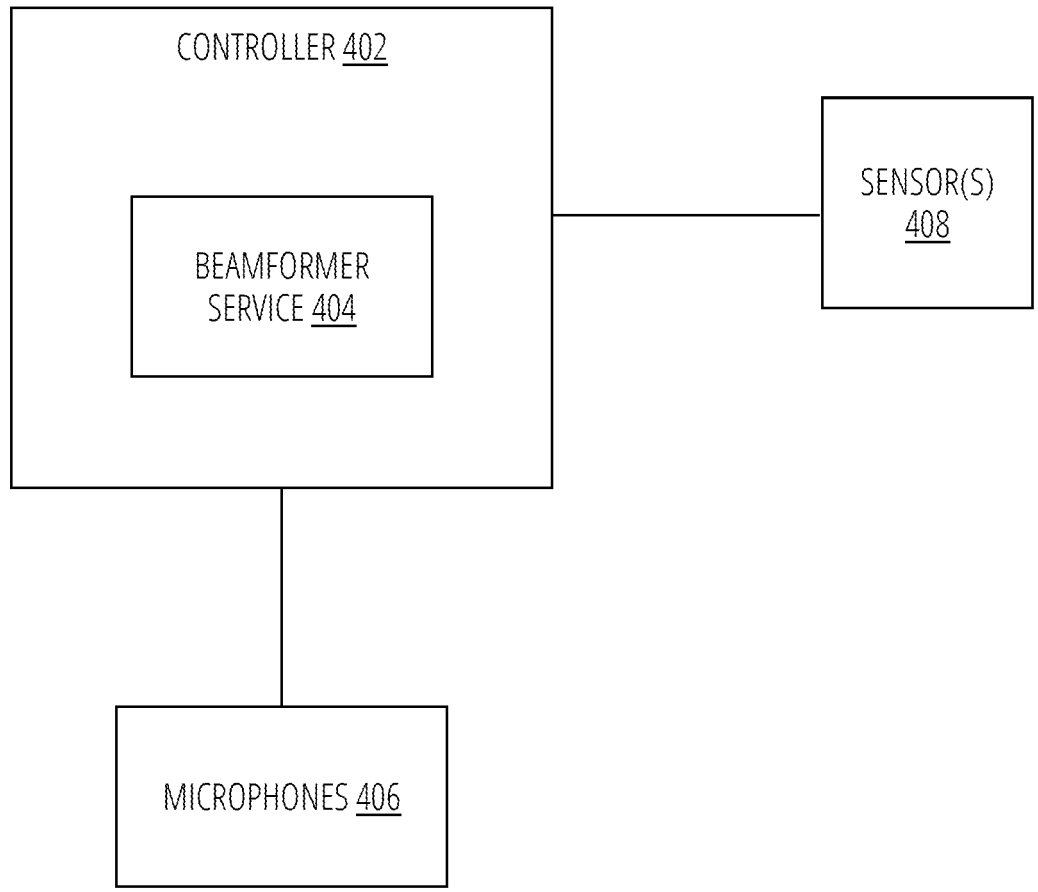
FIG. 4 illustrates a system diagram including a beamformer service in accordance with an example embodiment.

FIG. 4 illustrates a system diagram including a beamformer service in accordance with an example embodiment. The shown camera system 400 can select a set of microphones 406 based on the FOV of the camera (e.g., within same side or direction as a FOV of the camera) so that noise or other audio from a direction that is (and/or originating from a direction that is) outside of the FOV of the camera can be removed and cleaner audio can be produced corresponding to the area in a scene that is within the FOV of the camera. The goal is to have a stream of audio that is focused/narrowed in the same direction/area as the FOV of the camera and effectively cleaned up and without noise from a direction/area outside of the FOV of the camera.

A controller 402 includes a beamformer service 404 to receive data from sensor(s) 408. Based on an analysis of the data from sensor(s) 408, the beamformer service 404 selects which microphones 406 are best for capturing audio from the scene within the FOV of the camera, and then controller 402 activates the selected microphones to record the audio.

For example, the beamformer service 404 receives sensor data from an accelerometer and/or a gyroscope of a camera. The beamformer service 404 determines a position and/or a pose of the lens (e.g., and/or a FOV of the camera) based on the sensor data. The beamformer service 404 then selects a subset of microphones from the microphones 406 based on the pose of the lens (e.g., within a same direction or area as a FOV of the camera) and excludes other microphones (e.g., microphones located in a different direction and/or area as the FOV). The controller 402 then activates the selected subset of microphones.

The beamformer service 404 can include multiple ways for re-calibrating the FOV calculation and/or the microphone 406 selection. First, the accelerometer data can be obtained regularly. When a certain deviation (e.g., a threshold) is detected, the pose of the lens (e.g., and thus the FOV) can be updated. Then, the subset of the microphones 406 can be updated. Second, the pose of the lens can be updated at a predetermined time interval and the subset of the microphones can be updated accordingly.

In some embodiments, the beamformer service 404 can incorporate external factors, such as amplitude features or other characteristics of the signals from the microphones, within the beamforming of the microphones. Other factors such as the type of camera used (e.g., fisheye, focal lens, etc.) or configuration of the camera/lens can also be used by the beamformer service 404 in determining which microphones to select.

In some cases, other factors can also be used by the beamformer service 404 in determining which microphones 406 to use to record audio. Some examples of such factors can include the amplitudes of the signals from the microphones 406 or other characteristics of the signals from the microphones. For example, the microphones 406 with the highest signal amplitudes or cleanest signals can be selected for use (while the other microphones can be excluded). Thus, the beamformer service 404 can use the signal characteristics to determine which microphone is closest to a target or region and produces the best signals. For example, while the example camera illustrated in FIG. 3 includes eight microphones, only four microphones are selected for recording audio. The selected microphones are located relative to the FOV of the camera (e.g., on a portion of the camera located in a same direction as the incident light and/or the FOV).

Figure 5:
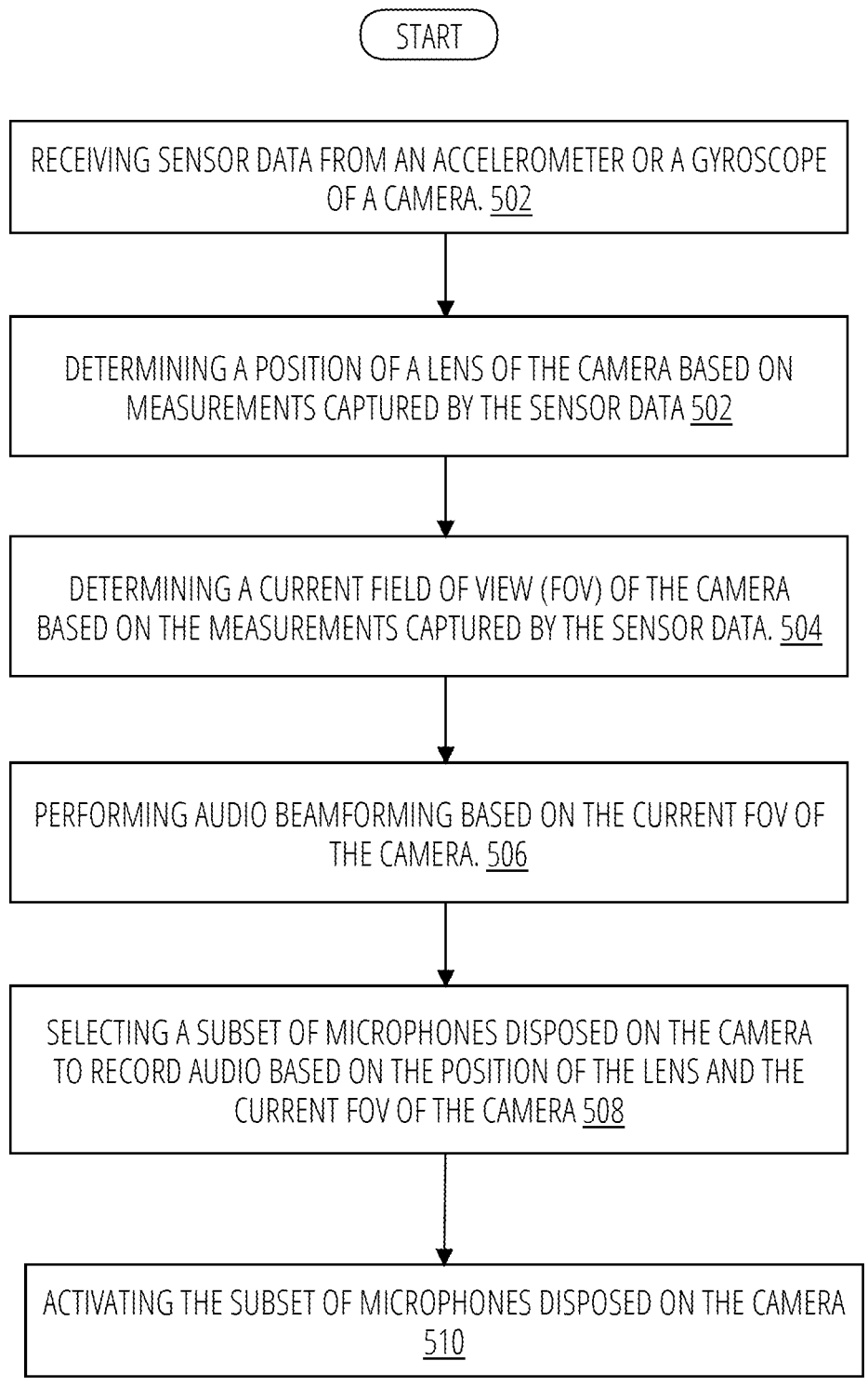
FIG. 5 illustrates a flowchart for improving audio quality through beamforming based on a camera's FOV in accordance with an example embodiment.

FIG. 5 illustrates an example method 500 for improving audio quality through beamforming based on a camera's FOV. Although the example method 500 depicts a particular sequence of operations, the sequence may be altered without departing from the scope of the present disclosure. For example, some of the operations depicted may be performed in parallel or in a different sequence that does not materially affect the function of the method 500. In other examples, different components of an example device or system that implements the method 500 may perform functions at substantially the same time or in a specific sequence.

The camera system is directed to the selection of a subset of microphones on the camera based on its field-of-view (FOV) to improve the audio quality (e.g., removing noise that is not within the FOV). For example, the camera system can determine which microphones of a camera to use based on a pose of the camera lens, the FOV of the camera, and/or the direction of incident light received by the camera lens.

According to some examples, method includes receiving sensor data from an accelerometer and/or a gyroscope of a camera at block 502. For example, the beamformer service 404 illustrated in FIG. 4 may receive sensor data from an accelerometer and a gyroscope of a camera. The accelerometer and gyroscope can be located within the base 106 of the camera illustrated in FIG. 1, for example, which measures the movement and/or tilt of lens 104. The gyroscope can capture orientation measurements of the camera and the accelerometer can measure a linear acceleration based on vibration.

According to some examples, the method includes determining a position of a lens of the camera based on measurements captured by the sensor data at block 502. For example, the beamformer service 404 illustrated in FIG. 4 may determine a position of a lens of the camera based on measurements determined from one or more features captured by the sensor data of the sensors 408. For example, the beamformer service 404 can receive first accelerometer data from a first accelerometer located or disposed on the base of the camera. The beamformer service 404 can receive second accelerometer data from a second accelerometer disposed on a sensor board of the camera, where the sensor board of the camera is moveable to point in a range of directions. Based on a combination of at least the first accelerometer data and the second accelerometer data, the beamformer service 404 can detect a direction the lens of the camera is pointed towards in relation to the body of the camera. The detected direction of the lens of the camera provides dynamic information about the tilt and movement of the lens in relation to the body of the camera, where the camera body is a point of reference for the movement of the lens.

According to some examples, the method includes determining the current field of view (FOV) of the camera based on the measurements captured by the sensor data at block 504. For example, the beamformer service 404 illustrated in FIG. 4 may determine a current field of view (FOV) of the camera based on the measurements determined by one or more features captured by the sensor data.

According to some examples, the method includes performing audio beamforming based on the current FOV of the camera at block 506. For example, the beamformer service 404 illustrated in FIG. 4 may perform audio beamforming based on the current FOV of the camera using a subset of selected microphones with microphone zones that cover the current FOV.

In some embodiments, for example, the beamformer service 404 can analyze the audio from the microphones 406 on the camera to determine signal amplitudes within the audio. The beamformer service 404 can then select the subset of microphones to be activated based on which microphones had the highest signal amplitude or lowest average level of noise.

In some embodiments, the beamformer service 404 can determine, based on the sensor data 408 from the accelerometer and/or the gyroscope of the camera, a direction of incident light received by the lens of the camera. The subset of microphones disposed on the camera are selected to record audio based on the direction of incident light received by the lens. The controller 402 can then activate the subset of microphones to record audio within the current FOV of the camera.

In some embodiments, the beamformer service 404 can determine that one or more of the microphones 406 are occluded by a portion of the camera body, preventing audio detection for a region of interest within the current FOV. In this case, the beamformer service 404 can dynamically select the best subset of microphones based on the determination that each microphone within the subset is not occluded by the portion of the camera body. In other words, the beamformer service 404 can pick the subset of microphones that are not occluded by the camera body for the things the camera is trying to hear. If the camera is, for example, pointed down towards a scene at an angle, the top two microphones may be occluded by the camera body. Those two microphones would not be selected by the beamformer service 404. But the beamformer service 404 would pick the bottom two microphones. The beamformer service 404 can perform the determination of occlusion and subsequent selection of non-occluded microphones automatically. No configuration is needed for the beamformer service 404 to select the best microphones, and no mechanical sensing of how much individual parts have turned is needed for the selection.

In some embodiments, the beamformer service 404 can remove audio originating outside of the FOV that appears to be within the current FOV area. For example, the beamformer service 404 can measure the direction and angle from which the audio signal is originating. The beamformer service 404 can then remove the subset of audio signals within the entire audio that originate outside of the area of the beamforming.

According to some examples, therefore, at block 508 the method includes selecting the subset of microphones disposed on the camera to record audio based on the position of the lens and the current FOV of the camera. The audio beamforming is arranged to match an area covered by the current FOV of the camera, where the audio beamforming matches the direction the lens is pointed and sound outside the current FOV is attenuated.

In some embodiments, the beamformer service 404 can dynamically modify the size and direction of the audio beamforming, where sound outside the size and direction of the audio beamforming is attenuated. For example, the beamformer service 404 can dynamically modify the angle of the audio beamforming. For example, the beamforming could be modified or set to a specific angle (e.g., 45 degree angle from the center of the camera lens). In some embodiments, the adjustment to the size and direction of the audio beamforming can be triggered based on detection of movement of the camera lens (e.g., if the camera lens is moving, the beamforming must also move accordingly).

According to some examples, the method includes activating the selected subset of microphones at block 510, where microphones outside the selected subset of microphones are excluded from activation so that audio originating from outside the current FOV is removed.

Additionally and/or alternatively, in some embodiments, the beamformer service 404 can switch between modes: a beamforming mode in which the audio beamforming is matched to the camera's current FOV; and an omnidirectional mode that turn the beamforming off such that sound outside the camera's current FOV can be recorded. The omnidirectional mode of receiving omnidirectional audio can be helpful for recording sounds outside the camera's FOV, such as a car crash that occurs off-camera and/or out of view. In some embodiments, the subset of microphones selected by the beamformer service 404 remains unchanged (e.g., the subset of microphones is activated while the rest are not activated). In other embodiments, all the microphones are activated to record audio.

Figure 6:
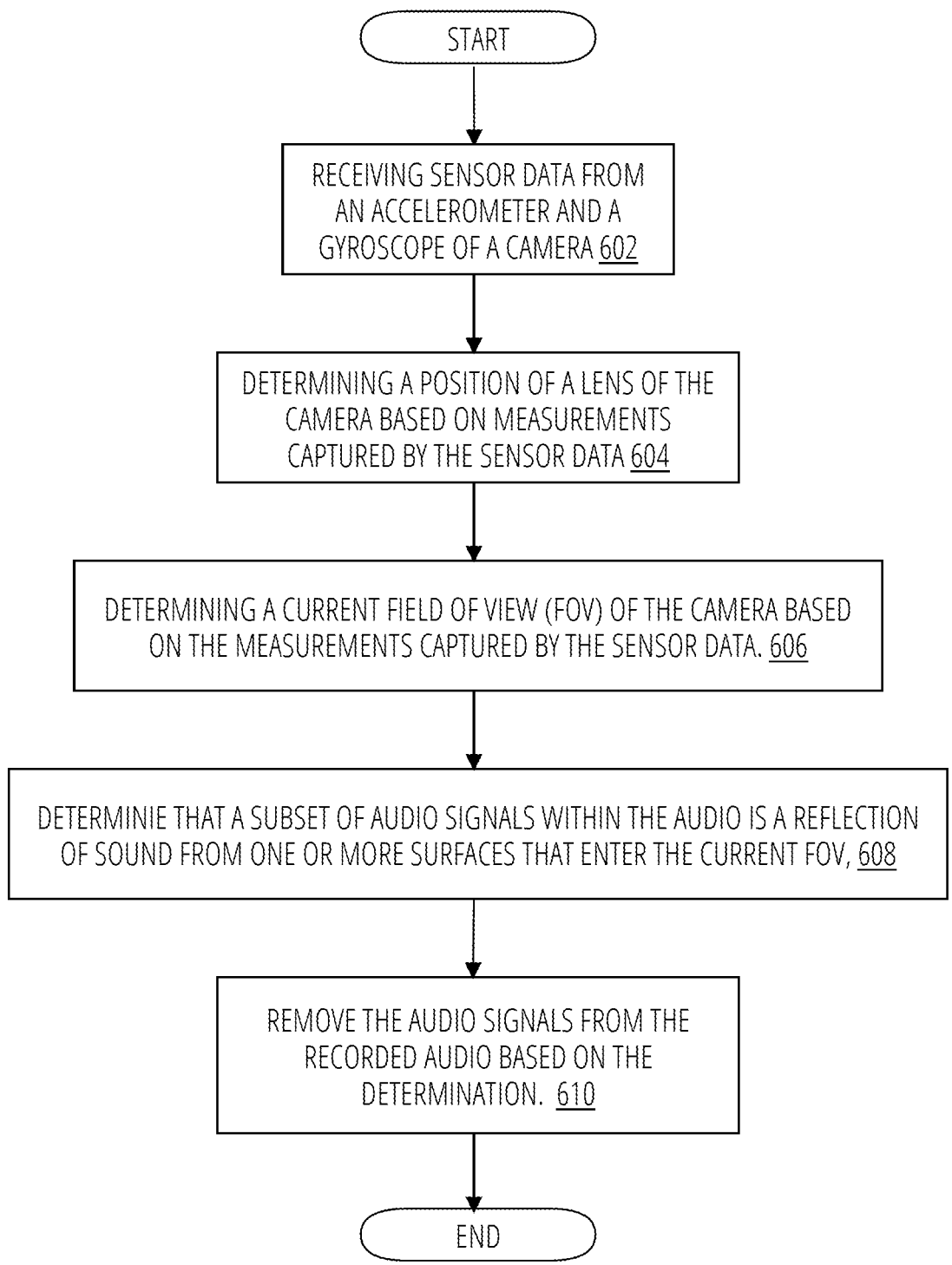
FIG. 6 illustrates a flowchart for performing dynamic beamforming based on a camera's FOV in accordance with an example embodiment.

FIG. 6 illustrates an example method for performing dynamic beamforming based on a camera's FOV, in accordance with example embodiments. Although the example method depicts a particular sequence of operations, the sequence may be altered without departing from the scope of the present disclosure. For example, some of the operations depicted may be performed in parallel or in a different sequence that does not materially affect the function of the method. In other examples, different components of an example device or system that implements the method may perform functions at substantially the same time or in a specific sequence.

According to some examples, the method includes receiving sensor data from an accelerometer and/or a gyroscope of a camera at block 602. For example, the beamformer service 404 illustrated in FIG. 4 may receive sensor data from one or more sensor(s) 408 on the camera, such as sensor data from an accelerometer and/or a gyroscope of a camera. For example, the gyroscope captures orientation measurements of the camera, and the accelerometer measures a linear acceleration based on vibration.

According to some examples, the method includes determining a position of a lens of the camera based on measurements captured by the sensor data at block 604. For example, the beamformer service 404 illustrated in FIG. 4 may determine a position of a lens of the camera based on measurements captured by the sensor data from sensor(s) 408. The method further includes determining a current field of view (FOV) of the camera based on the measurements captured by the sensor data at block 606. For example, the beamformer service 404 illustrated in FIG. 4 may determine a current field of view (FOV) of the camera based on one or more features within the sensor data captured by the sensor(s) 408.

According to some examples, the method includes determining that a subset of audio signals within the audio is a reflection of sound from one or more surfaces that enter the current FOV at block 608. For example, the beamformer service 404 illustrated in FIG. 4 may determine, from features within the audio recording, that a subset of audio signals within the audio recording is a reflection of sound from one or more surfaces that enter the current FOV. These reflected audio signals originate outside the current FOV, and therefore create noise within the audio recording. Examples of reflected audio signals come from reflections from nearby walls, pieces of furniture, etc. In addition, in some embodiments the beamformer service 404 can determine that some microphones have better performance due to the surfaces within the environment of the camera (e.g., cameras in the corner of a room may do better because there is less reflection of audio signals contributing to noise within the recording, even though it may be expected that cameras in that location would perform worse than a camera in a more open position). Once the beamformer service 404 determines which portions of the audio signal are reflected signals from outside the camera's FOV, the method includes removing the audio signals from the recorded audio based on the determination at block 610. For example, the beamformer service 404 illustrated in FIG. 4 may remove the portions of the audio signals corresponding to the features within the data indicating reflected audio signals from the recorded audio.

Additionally and/or alternatively, according to some examples, the beamformer service 404 can, using the sensor data from the sensor(s) 408, measure a direction and angle from which the audio is originating. If the direction and angle indicate that a subset of the audio signal is coming from outside the current FOV of the camera, the beamformer service 404 can remove the subset of audio signals within the audio that originate outside the area of the beamforming.

Additionally and/or alternatively, according to some examples, the beamformer service 404 can determine that the camera is positioned proximate to a type of surface. For example, one or more features within the sensor data can indicate that the camera is next to a reflective surface like a wall, and therefore a subset of audio signals within the audio will be reflected signals from the wall. As well as removing the reflected signals, controller 402 can take the method a step further and adjust the size and/or the direction of the beamforming based on the location of the surface. For example, controller 402 can minimize (or expand) the size, and/or change the direction of the beamforming to minimize the portions of the audio signal reflected from the surface.

Additionally and/or alternatively, according to some examples, the beamformer service 404 can receive optical data from the camera (e.g., image data from the lens of the camera). The optical data can indicate that the camera is positioned next to a reflective surface, such as a wall, and the beamformer service 404 can correspondingly search for reflected features within the recorded audio and then remove the reflected features from it. In other embodiments, a map of the environment may be substituted or used in addition to the optical data, where the one or more features of the environment (e.g., walls, furniture, etc.) are determined from the map of the environment. Moreover, the beamformer service 404 can select the subset of microphones based on the features of the environment proximate to the camera. For example, microphones nearest the wall may not be selected even if they contribute to the coverage of the camera's current FOV.

According to some examples, the method can include modifying the width of the beamformer in accordance with a zoom change in the camera. When a camera zooms in or out of a scene, the FOV of the camera changes correspondingly. The beamformer service 404 can receive an indication of the zoom change of the camera, and based on the zoom change, modify the beamforming area to match the changes of the FOV. In this way, even though the FOV is changing, audio outside the size and direction of the audio beamforming continues to be attenuated in accordance with the changing FOV.

According to some examples, the method can include splitting the beamformer into one or more sub beams within the current FOV that cover a tighter area around an object of interest. For example, the beamformer service 404 may split the beamformer into sub beams that cover an area around a person or automobile. This functionality can be especially useful for fisheye cameras, where multiple beams within a stationary, wide FOV can focus on objects or people of interest.

Additionally and/or alternatively, according to some examples, the camera can detect movement of the camera lens. The movement of the camera lens can trigger the beamformer service 404 to adjust the size and the direction of the audio beamforming based on where and how the camera lens moves (e.g., and how the current FOV is affected by the movement).

Figure 7:
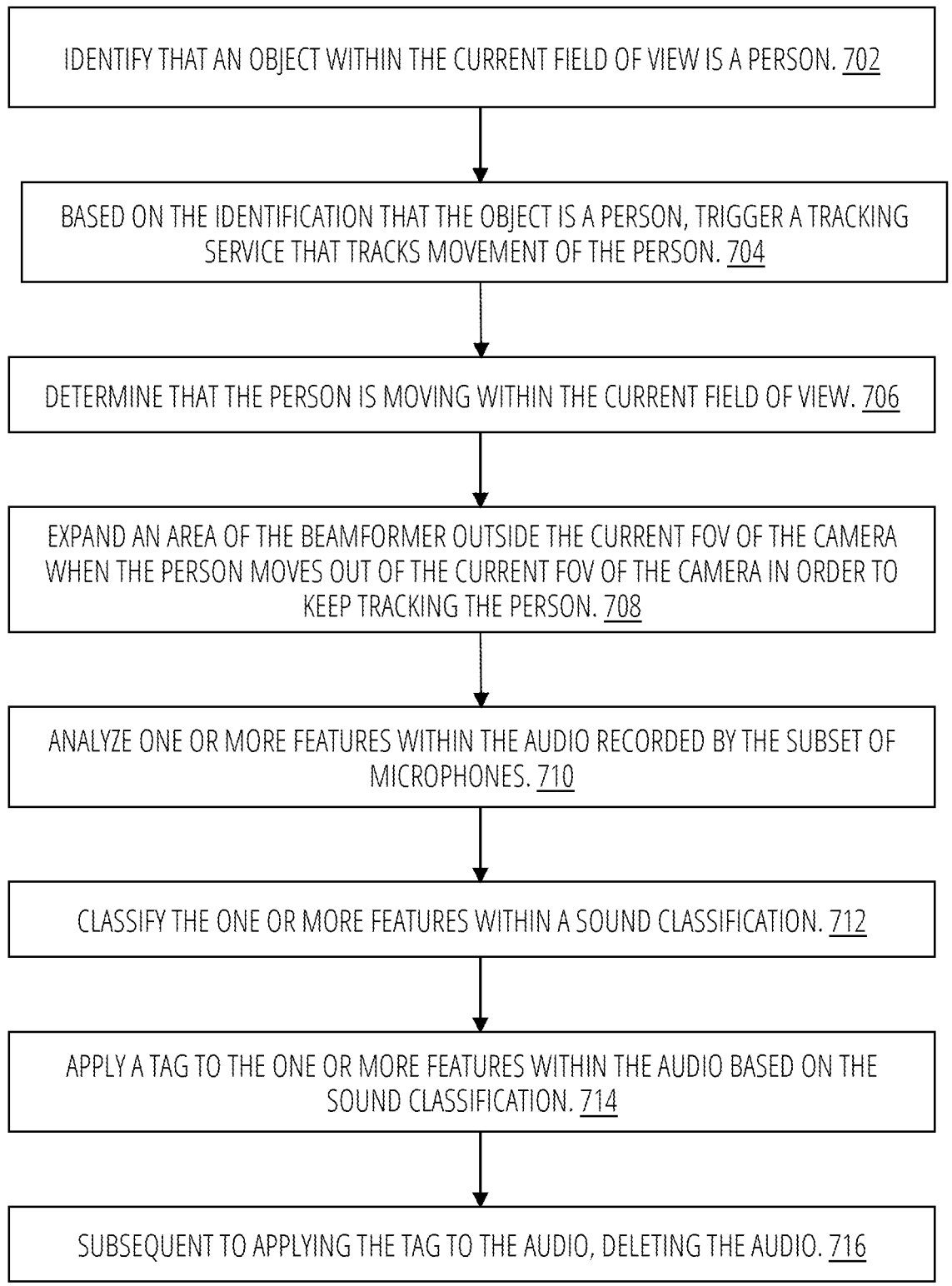
FIG. 7 illustrates a flowchart for preserving user privacy in a camera system in accordance with an example embodiment.

FIG. 7 illustrates an example method for preserving user privacy in a camera system, according to example embodiments. Although the example method depicts a particular sequence of operations, the sequence may be altered without departing from the scope of the present disclosure. For example, some of the operations depicted may be performed in parallel or in a different sequence that does not materially affect the function of the method. In other examples, different components of an example device or system that implements the method may perform functions at substantially the same time or in a specific sequence.

According to some examples, the method includes identifying that an object within the current field of view is a person at block 702. For example, the beamformer service 404 illustrated in FIG. 4 may identify types of objects within the current FOV. In some embodiments, one or more models can be applied to the sensor data collected by sensor(s) 408 that identifies features related to the type of object, such as a person, animal, vehicle, etc.

Based on the identification of the type of object (e.g., that the object is a person), the method further includes triggering a tracking service that tracks movement of the person at block 704. For example, the beamformer service 404 may trigger a tracking service that tracks the movement of the person within the FOV. In some embodiments, the method includes determining that the person is moving within the current field of view at block 706. For example, the controller 402 can move the camera to keep the person within the FOV. In other embodiments, such as those with a fisheye camera lens, one or more sub beams within the beamformer can be directed to the person to focus the audio recording on them as they move through the environment captured by the camera.

Additionally and/or alternatively, in some examples, the method includes expanding an area of the beamformer outside the current FOV of the camera at block 708. For example, the beamformer service 404 may expand an area of the beamformer outside the current FOV of the camera, such as when the person being tracked moves out of the current FOV of the camera.

According to some examples, the method includes privacy-related features. For example, the beamformer service 404 can analyze one or more features within the audio recorded by the subset of microphones at block 710. For example, the beamformer service 404 can classify the one or more features within a sound classification based on the one or more features within the audio at block 712. Classification of sounds can be related to the object type (e.g., speech vs glass breaking), subject of speech, inflection and language of speech, emotional characteristics of the speech (e.g., anger vs calm speech), etc. Based on the sound classification, the beamformer service 404 can apply a tag to the one or more features within the audio based on the sound classification at block 714. Subsequent to applying the tag to the audio, the beamformer service 404 can delete the audio at block 716. In this way, the audio does not need to be stored or accessed—the tag provides enough information to preserve privacy while also understanding what's happening within the environment of the camera.

Figure 8:
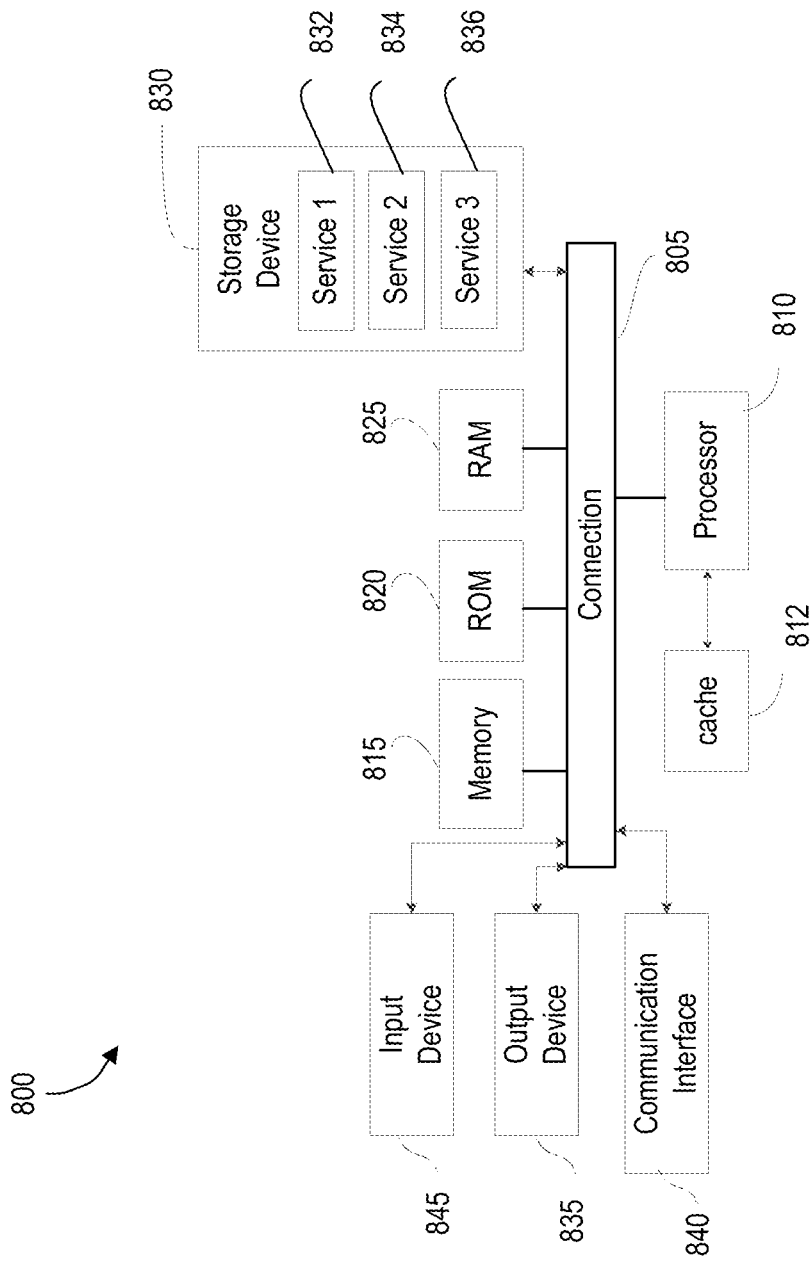
FIG. 8 illustrates an example of computing system 800, which can be any computing device that can implement components of the system in accordance with one embodiment.

FIG. 8 shows an example of computing system 800, which can be for example any computing device making up [[insert reference to one or more devices discussed earlier in the disclosure]] or any component thereof in which the components of the system are in communication with each other using connection 805. Connection 805 can be a physical connection via a bus, or a direct connection into processor 810, such as in a chipset architecture. Connection 805 can also be a virtual connection, networked connection, or logical connection.

In some embodiments computing system 800 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 800 includes at least one processing unit (CPU or processor) 810 and connection 805 that couples various system components including system memory 815, such as read only memory (ROM) 820 and random access memory (RAM) 825 to processor 810. Computing system 800 can include a cache of high-speed memory 812 connected directly with, in close proximity to, or integrated as part of processor 810.

Processor 810 can include any general purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. There is no restriction on operating on any particular hardware arrangement and therefore the basic features here may easily be substituted for improved hardware or firmware arrangements as they are developed.

Storage device 830 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 830 can include software services, servers, services, etc., that when the code that defines such software is executed by the processor 810, it causes the system to perform a function. In some embodiments, a hardware service that performs a particular function can include the software component stored in a computer-readable medium in connection with the necessary hardware components, such as processor 810, connection 805, output device 835, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Aspect 1. A method for improving audio quality comprising: receiving sensor data from an accelerometer and a gyroscope of a camera, wherein the gyroscope captures orientation measurements of the camera and the accelerometer measures a linear acceleration based on vibration; determining a position of a lens of the camera based on measurements captured by the sensor data; determining a current field of view (FOV) of the camera based on the measurements captured by the sensor data; and performing audio beamforming based on the current FOV of the camera by: selecting a subset of microphones disposed on the camera to record audio based on the position of the lens and the current FOV of the camera; and activating the subset of microphones disposed on the camera, wherein microphones outside the selected subset of microphones are excluded from activation so that audio originating outside of the current FOV is removed.

Aspect 2. The method of Aspect 1, the method further comprising: analyzing audio from one or more microphones on the camera to determine signal amplitudes within the audio; and selecting the subset of microphones to be activated based on the one or more microphones with a highest signal amplitude or lowest average level of noise.

Aspect 3. The method of any of Aspects 1 to 2, the method further comprising: determining, based on the sensor data from the accelerometer and the gyroscope of the camera, a direction of incident light received by a lens of the camera; and selecting the subset of microphones disposed on the camera to record audio based on the direction of incident light received by the lens; and activating the subset of microphones to record audio within the current FOV of the camera.

Aspect 4. The method of any of Aspects 1 to 3, the method further comprising: receiving first accelerometer data from a first accelerometer disposed on the base of the camera; receiving second accelerometer data from a second accelerometer disposed on a sensor board of the camera, wherein the sensor board of the camera is moveable to point in a range of directions; and detecting a direction the lens of the camera is pointed towards in relation to a body of the camera based on a combination of at least the first accelerometer data and the second accelerometer data; wherein the detected direction of the lens of the camera provides dynamic information about tilt and movement of the lens in relation to the body of the camera, and wherein the camera body is a point of reference for the movement of the lens.

Aspect 5. The method of any of Aspects 1 to 4, the method further comprising: arranging the audio beamforming to match an area covered by the current FOV of the camera, wherein the audio beamforming matches a direction the lens is pointed and sound outside the current FOV is attenuated.

Aspect 6. The method of any of Aspects 1 to 5, the method further comprising: switching from a first mode of matching the audio beamforming to the current FOV to a second mode of receiving omnidirectional audio. E.g., may want to hear sounds outside the beamforming audio, such as a car crash outside of view.

Aspect 7. The method of any of Aspects 1 to 6, the method further comprising: determining that one or more microphones are occluded by a portion of the camera body, preventing audio detection for a region of interest within the current FOV; and dynamically selecting the subset of microphones based on the determination that each microphone within the subset is not occluded by the portion of the camera body.

Aspect 8. The method of any of Aspects 1 to 7, the method further comprising: dynamically modifying a size and a direction of the audio beamforming, wherein sound outside the size and direction of the audio beamforming is attenuated.

Aspect 9. The method of any of Aspects 1 to 8, the method further comprising: dynamically modifying an angle of the audio beamforming, wherein sound outside a size and direction of the audio beamforming is attenuated. E.g., specific angle (45 degree angle).

Aspect 10. The method of any of Aspects 1 to 9, the method further comprising: triggering an adjustment to a size and a direction of the audio beamforming based on a detection of movement of the camera lens.

Aspect 11. The method of any of Aspects 1 to 10, the method further comprising: determining that a subset of audio signals within the audio is a reflection of sound from one or more surfaces that enter the current FOV, wherein the audio signals originate outside the current FOV; and removing the audio signals from the recorded audio based on the determination.

Aspect 12. The method of any of Aspects 1 to 11, wherein the method further comprises: measuring a direction and angle from which the audio is originating; and removing a subset of audio signals within the audio that original outside an area of the beamforming.

Aspect 13. The method of any of Aspects 1 to 12, the method further comprising: determining the camera is positioned proximate to a surface, wherein a subset of audio signals within the audio will be reflected from the surface; and adjusting a size and a direction of the beamforming based on a location of the surface, wherein the size and direction minimizes the subset of audio signals within the audio reflected from the surface.

Aspect 14. The method of any of Aspects 1 to 13, the method further comprising: receive recorded audio from a first subset of microphones disposed on the camera; receive recorded audio from a second subset of microphones disposed on the camera; and based on an analysis of audio quality from the first subset of microphones and the second subset of microphones, select the first subset of microphones for subsequent audio recordings based on the first subset of microphones having better audio quality than the second subset of microphones.

Aspect 15. The method of any of Aspects 1 to 14, wherein the subset of microphones are selected based on one or more features of an environment proximate to the camera, the one or more features of the environment determined from a map of the environment.

Aspect 16. The method of any of Aspects 1 to 15, wherein a width of the beamformer is modified in accordance with a zoom change in the current FOV.

Aspect 17. The method of any of Aspects 1 to 16, the method further comprising: analyzing one or more features within the audio recorded by the subset of microphones; and classifying the one or more features within a sound classification based on the one or more features within the audio; and applying a tag to the one or more features within the audio based on the sound classification.

Aspect 18. The method of any of Aspects 1 to 17, the method further comprising: subsequent to applying the tag to the audio, deleting the audio.

Aspect 19. The method of any of Aspects 1 to 18, the method further comprising: identifying that an object within the current field of view is a person; based on the identification that the object is a person, triggering a tracking service that tracks movement of the person; determining that the person is moving within the current field of view; and expanding an area of the beamformer outside the current FOV of the camera when the person moves out of the current FOV of the camera in order to keep tracking the person.

Aspect 20. The method of any of Aspects 1 to 19, the method further comprising: splitting the beamformer into one or more sub beams within the current FOV that cover a tighter area around an object of interest.

What is claimed is:

1. A method for improving audio quality comprising:
receiving sensor data from an accelerometer of a camera;
determining a position of a lens of the camera based on measurements captured by the sensor data;
determining a current field of view (FOV) of the camera based on the measurements captured by the sensor data; and
performing audio beamforming based on the current FOV of the camera by:
  selecting a subset of microphones disposed on the camera to record audio based on the position of the lens and the current FOV of the camera; and
  activating the subset of microphones disposed on the camera, wherein microphones outside the selected subset of microphones are excluded from activation so that audio originating outside of the current FOV is removed.

2. The method of claim 1, the method further comprising:
analyzing audio from one or more microphones on the camera to determine signal amplitudes within the audio; and
selecting the subset of microphones to be activated based on the one or more microphones with a highest signal amplitude or lowest average level of noise.

3. The method of claim 1, the method further comprising:
determining, based on the sensor data from the accelerometer and a gyroscope of the camera, a direction of incident light received by a lens of the camera;
selecting the subset of microphones disposed on the camera to record audio based on the direction of incident light received by the lens; and
activating the subset of microphones to record audio within the current FOV of the camera.

4. The method of claim 1, the method further comprising:
receiving first accelerometer data from a first accelerometer disposed on the base of the camera;
receiving second accelerometer data from a second accelerometer disposed on a sensor board of the camera, wherein the sensor board of the camera is moveable to point in a range of directions; and
detecting a direction the lens of the camera is pointed towards in relation to a body of the camera based on a combination of at least the first accelerometer data and the second accelerometer data;
wherein the detected direction of the lens of the camera provides dynamic information about tilt and movement of the lens in relation to the body of the camera, and wherein the camera body is a point of reference for the movement of the lens.

5. The method of claim 1, the method further comprising:
arranging the audio beamforming to match an area covered by the current FOV of the camera, wherein the audio beamforming matches a direction the lens is pointed and sound outside the current FOV is attenuated.

6. The method of claim 1, the method further comprising:
switching from a first mode of matching the audio beamforming to the current FOV to a second mode of receiving omnidirectional audio.

7. The method of claim 1, the method further comprising:
determining that one or more microphones are occluded by a portion of the camera body, preventing audio detection for a region of interest within the current FOV; and
dynamically selecting the subset of microphones based on the determination that each microphone within the subset is not occluded by the portion of the camera body.

8. A computing apparatus comprising:
a processor; and
a memory storing instructions that, when executed by the processor, configure the apparatus to:
receive sensor data from an accelerometer of a camera;
determine a position of a lens of the camera based on measurements captured by the sensor data;
determine a current field of view (FOV) of the camera based on the measurements captured by the sensor data; and
perform audio beamforming based on the current FOV of the camera by:
  select a subset of microphones disposed on the camera to record audio based on the position of the lens and the current FOV of the camera; and
  activate the subset of microphones disposed on the camera, wherein microphones outside the selected subset of microphones are excluded from activation so that audio originating outside of the current FOV is removed.

9. The computing apparatus of claim 8, wherein the instructions further configure the apparatus to:
- analyze audio from one or more microphones on the camera to determine signal amplitudes within the audio; and
- select the subset of microphones to be activated based on the one or more microphones with a highest signal amplitude or lowest average level of noise.

10. The computing apparatus of claim 8, wherein the instructions further configure the apparatus to:
- determine, based on the sensor data from the accelerometer and a gyroscope of the camera, a direction of incident light received by a lens of the camera;
- select the subset of microphones disposed on the camera to record audio based on the direction of incident light received by the lens; and
- activate the subset of microphones to record audio within the current FOV of the camera.

11. The computing apparatus of claim 8, wherein the instructions further configure the apparatus to:
- receive first accelerometer data from a first accelerometer disposed on the base of the camera;
- receive second accelerometer data from a second accelerometer disposed on a sensor board of the camera, wherein the sensor board of the camera is moveable to point in a range of directions; and
- detect a direction the lens of the camera is pointed towards in relation to a body of the camera based on a combination of at least the first accelerometer data and the second accelerometer data;
- wherein the detected direction of the lens of the camera provides dynamic information about tilt and movement of the lens in relation to the body of the camera, and wherein the camera body is a point of reference for the movement of the lens.

12. The computing apparatus of claim 8, wherein the instructions further configure the apparatus to:
- arrange the audio beamforming to match an area covered by the current FOV of the camera, wherein the audio beamforming matches a direction the lens is pointed and sound outside the current FOV is attenuated.

13. The computing apparatus of claim 8, wherein the instructions further configure the apparatus to:
- switch from a first mode of matching the audio beamforming to the current FOV to a second mode of receiving omnidirectional audio.

14. The computing apparatus of claim 8, wherein the instructions further configure the apparatus to:
- determine that one or more microphones are occluded by a portion of the camera body, preventing audio detection for a region of interest within the current FOV; and
- dynamically select the subset of microphones based on the determination that each microphone within the subset is not occluded by the portion of the camera body.

15. A non-transitory computer-readable storage medium, the computer-readable storage medium including instructions that when executed by a computer, cause the computer to:
- receive sensor data from an accelerometer of a camera;
- determine a position of a lens of the camera based on measurements captured by the sensor data;
- determine a current field of view (FOV) of the camera based on the measurements captured by the sensor data; and
- perform audio beamforming based on the current FOV of the camera by:
  - select a subset of microphones disposed on the camera to record audio based on the position of the lens and the current FOV of the camera; and
  - activate the subset of microphones disposed on the camera, wherein microphones outside the selected subset of microphones are excluded from activation so that audio originating outside of the current FOV is removed.

16. The computer-readable storage medium of claim 15, wherein the instructions further configure the computer to:
- analyze audio from one or more microphones on the camera to determine signal amplitudes within the audio; and
- select the subset of microphones to be activated based on the one or more microphones with a highest signal amplitude or lowest average level of noise.

17. The computer-readable storage medium of claim 15, wherein the instructions further configure the computer to:
- determine, based on the sensor data from the accelerometer and a gyroscope of the camera, a direction of incident light received by a lens of the camera;
- select the subset of microphones disposed on the camera to record audio based on the direction of incident light received by the lens; and
- activate the subset of microphones to record audio within the current FOV of the camera.

18. The computer-readable storage medium of claim 15, wherein the instructions further configure the computer to:
- receive first accelerometer data from a first accelerometer disposed on the base of the camera;
- receive second accelerometer data from a second accelerometer disposed on a sensor board of the camera, wherein the sensor board of the camera is moveable to point in a range of directions; and
- detect a direction the lens of the camera is pointed towards in relation to a body of the camera based on a combination of at least the first accelerometer data and the second accelerometer data;
- wherein the detected direction of the lens of the camera provides dynamic information about tilt and movement of the lens in relation to the body of the camera, and wherein the camera body is a point of reference for the movement of the lens.

19. The computer-readable storage medium of claim 15, wherein the instructions further configure the computer to:
- arrange the audio beamforming to match an area covered by the current FOV of the camera, wherein the audio beamforming matches a direction the lens is pointed and sound outside the current FOV is attenuated.

20. The computer-readable storage medium of claim 15, wherein the instructions further configure the computer to:
- switch from a first mode of matching the audio beamforming to the current FOV to a second mode of receiving omnidirectional audio.

\* \* \* \* \*